Nov. 16, 1965     W. HAMILTON     3,217,686

SEALING STRUCTURE

Filed March 19, 1965     2 Sheets-Sheet 1

INVENTOR.
WALLACE HAMILTON

BY

ATTORNEY

INVENTOR.
WALLACE HAMILTON
BY
ATTORNEY

United States Patent Office 3,217,686
Patented Nov. 16, 1965

3,217,686
SEALING STRUCTURE
Wallace Hamilton, Bentleyville, Ohio, assignor to PneumoDynamics Corporation, Cleveland, Ohio, a corporation of Delaware
Filed Mar. 19, 1965, Ser. No. 441,288
13 Claims. (Cl. 114—202)

This invention relates generally to power operated hatch cover systems for covering hatchways of ships, vessels or the like and more particularly to new and improved sealing structure for such hatch cover systems.

This application is a continuation-in-part application of my copending application Serial Number 123,785, filed July 13, 1961, for Hatch Cover System, now United States Letters Patent Number 3,180,302, issued April 27, 1965.

It is an important object of this invention to provide a hatch cover system with new and improved sealing structure for preventing leakage between a hatchway and a hatch cover.

It is another important object of this invention to provide inflatable sealing structure for a hatch cover system of the type employed on the weather deck of a ship or the like.

It is still another object of this invention to provide inflatable sealing structure for a hatch cover system with an adjustment for compensating in variations in manufacturing tolerances to enable the sealing structure to possess a substantially constant sealing effect throughout the entire extent thereof.

Other objects and important features of this invention will be apparent from a study of the specification following taken with the drawing, which together show, illustrate, disclose and describe a preferred embodiment and modification of the invention in what is now considered to be the best mode of practicing the principle thereof which other embodiments or modifications may be suggested to those having the benefit of the teachings herein and such other embodiments or modifications are intended to be reserved especially as they fall within the scope and spirit of the subjoined claims.

In the drawing:

FIGURE 1 is a perspective view of a hatch cover system having the novel and improved sealing structure of this invention incorporated therein and illustrating the hatch cover system in a position for covering or closing a hatchway of a ship, vessel or the like;

Figure 4:
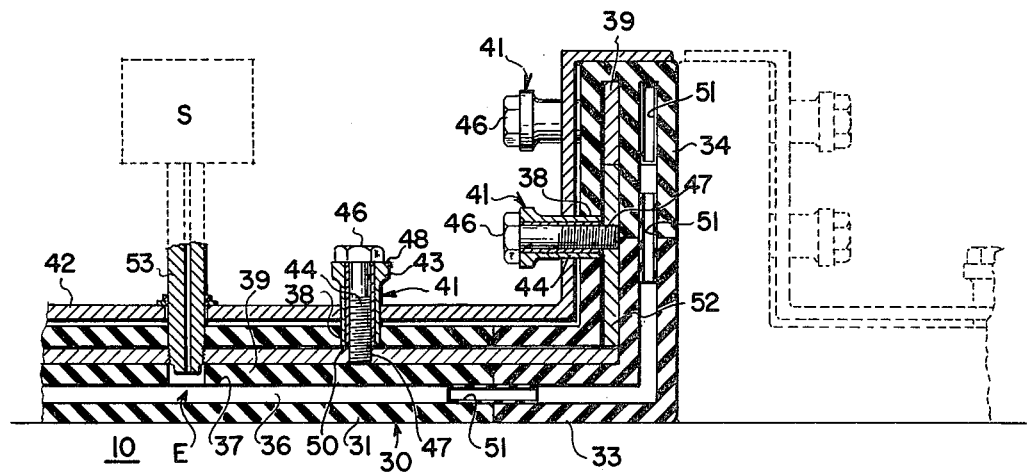
Figure 5:
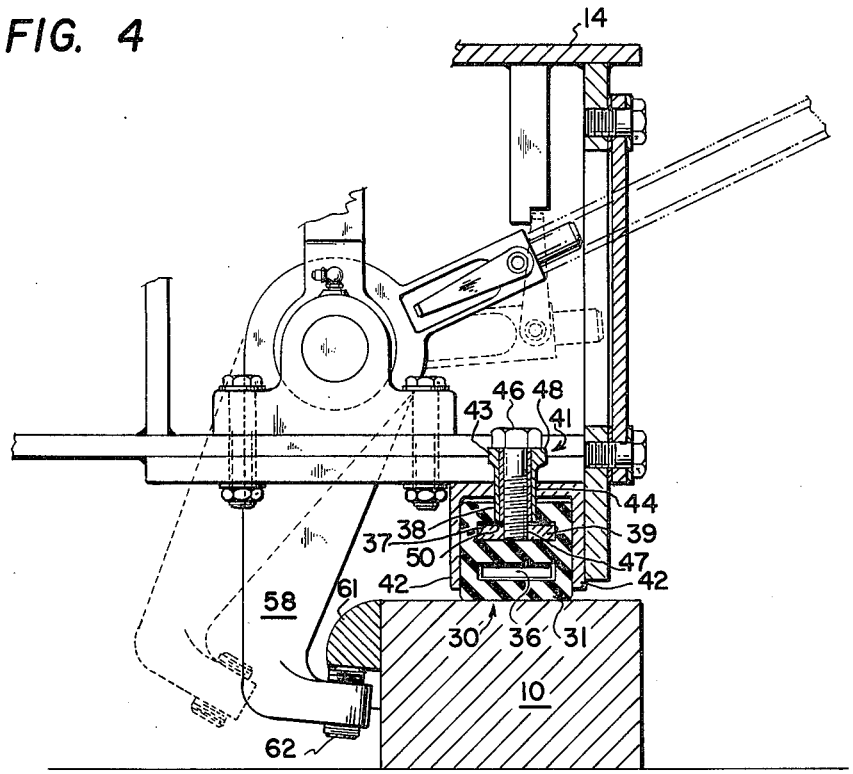

FIGURE 4 is an enlarged side elevational fragmentary view of FIGURE 5, partially in section, illustrating the structural details of the sealing structure together with the mounting thereof to the hatch cover system, and FIGURE 5 is a fragmentary cross-sectional view of FIGURE 4 illustrating the sealing structure in sealing position for creating a fluid tight seal between the panels of the hatch cover system and the hatchway of a ship, vessel or the like.

Figure 1:
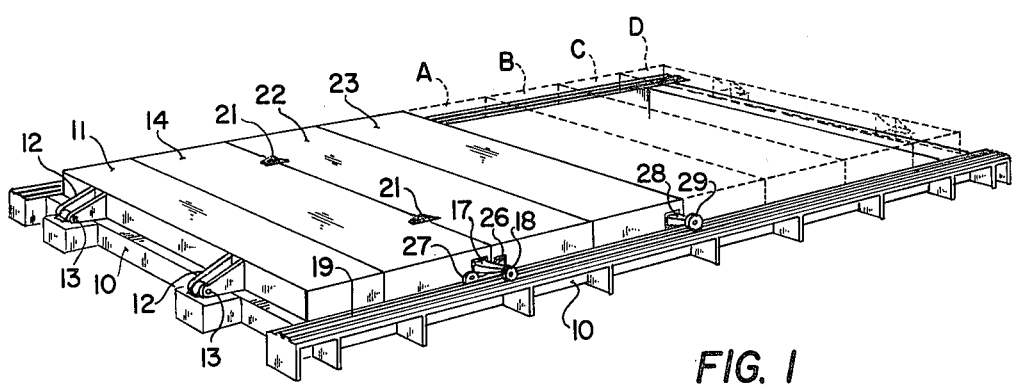

Attention is now directed to FIGURE 1 of the drawing wherein a hatch cover system is illustrated in a position for closing or covering a hatchway of a ship, vessel or the like wherein the hatchway is defined by an upstanding coaming 10 which extends about the periphery of the hatchway. The hatch cover system comprises a plurality of substantially planar panels 11, 14, 22 and 23 with the first panel 11 being pivotally mounted to the coaming 10 by hinge means 12 for rotation about a generally horizontally disposed pivot axis 13. The second panel 14, is in turn, pivoted on the first panel 11 by hinge means 16, as illustrated in FIGURE 2 of the drawing, with the second panel 14 being further provided with roller support arms 17 and anti-friction means in the form of rollers 18 being journaled thereon.

Figure 2:
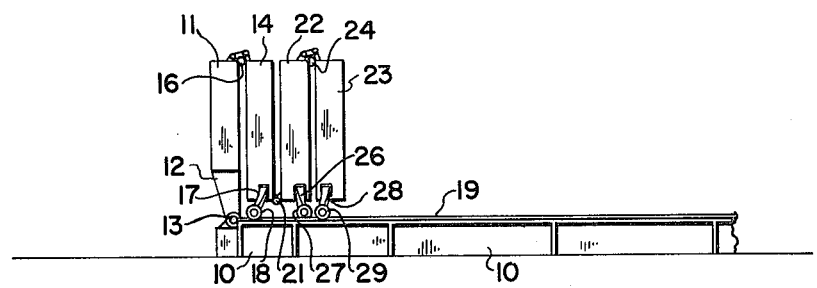
FIGURE 2 is a side elevational view of the hatch cover system shown in FIGURE 1 but illustrating the system in an open position clear of the hatchway.

Guide track support structure 19 extends along each side of the hatchway on the coaming 10 for supporting the rollers 18 of the hatch cover system which obviously will also support the respective panel that is associated therewith during movement of the hatch cover system between the folded or opened position as illustrated in FIGURE 2 to the closed or extended position as illustrated in FIGURE 1 of the drawing. It is to be understood that other roller support arms such as the arms 17, other anti-friction devices such as the rollers 18 as well as other guide track structures similar to the tracks 19 may be provided on the sides of the coaming 10 of the hatchway and only one combination of such structure has been illustrated, shown, described and disclosed herein purely from the standpoint of brevity.

Hinge means 21 pivotally connect the second panel 14 to the third panel 22 which is in turn pivotally connected to the fourth panel 23 by hinge means 24 as illustrated in FIGURE 2 of the drawing. The panels 11, 14, 22 and 23 of the hatch cover system cooperate to cover the hatchway when in the extended position as shown in FIGURE 1 of the drawing and fold clear of the hatchway when in the opened position as illustrated in FIGURE 2. If the hatchway is large, it may be necessary to provide additional pairs of panels A, B, C and D or provide a similar hatch cover assembly of panels which operate to fold to the other end of the hatchway. Generally, the number of panels used for a complete hatch cover system is determined by the size of the hatchway and the storage space available adjacent to the ends of the hatchway. It should be understood that even though the hatch cover system illustrated only comprises four panels that systems having different numbers of panels may be provided.

A roller support arm 26 is mounted on each side of the third panel 22 and is provided with anti-friction means such as a roller 27 which engages the track 19. Similarly, support arms 28 and rollers 29 are mounted on the fourth panel 23 of the hatch cover system. The support arms 17 and 26 are proportioned to bypass each other as the panels move to the extended position as illustrated in FIGURE 1 and the rollers 27 and 18 engage opposite sides of the track 19 to permit them to pass each other. If a similar assembly of panels is provided at the opposite end of the hatchway, the support arms thereof will correspond to the arms 28 and would be arranged to bypass the arms 28.

Hydraulically operated actuation means not illustrated may be used to power the panels 11, 14, 22 and 23 between the opened position of FIGURE 2 and the closed or extended position of FIGURE 1.

Figure 3:
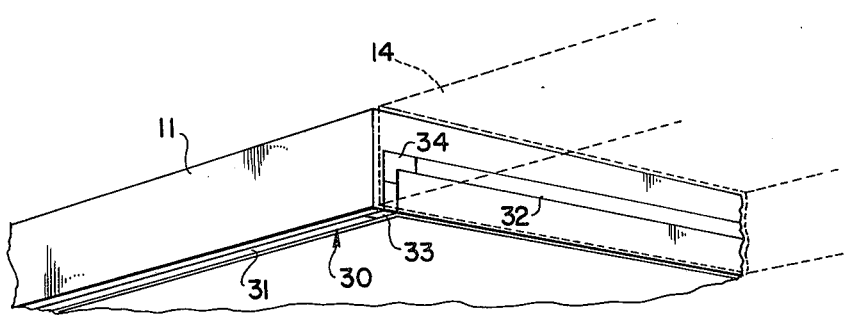
FIGURE 3 is a fragmentary perspective view of a corner of one panel of the hatch cover system illustrated in FIGURES 1 and 2 showing the arrangement of the sealing structure.

In order to provide a fluid tight joint between adjacent ones of the panels 11, 14, 22 and 23 and between the panels 11, 14, 22 and 23 and the coaming 10 of the hatchway, inflatable fluid sealing structure 30 is provided. As illustrated in FIGURE 3 of the drawing, the sealing structure 30 comprises a lower or bottom portion 31 which extends along the lower or bottom part of the sides of each of the panels 11, 14, 22 and 23 of the hatch cover system and a lateral or upper portion 32 which extends generally laterally across the face of the end part of each of the panels 11, 14, 22 and 23 of the hatch cover system. The bottom seal portion 31 engages the coaming 10 of the hatchway and the lateral seal portion 32 engages a similar lateral portion on the adjacent panel to provide a seal between such adjacent panels. A first corner element 33 is positioned at the end of the bottom seal portion 31 and joins with a second corner element 34 which in turn connects to the lateral seal portion 32. The sealing structure 30 extends around the periphery of each of the panels 11, 14, 22 and 23 and is continuous in that each panel is provided with a closed loop of sealing surface.

Reference should now be made to FIGURES 4 and 5 of the drawing which illustrate the sealing structure 30 of the seal and the support thereof to the panels 11, 14, 22 and 23 of the hatch cover system. The sealing structure 30 is preferably formed as an extrusion molded from a rubber like material, such as neoprene or the like, having a durometer in the order of 55. The part of the seal which forms both the bottom portions 31 and the lateral portions 32 have a cross-sectional configuration as illustrated in FIGURE 5 of the drawing which defines a pair of openings, one of which is an axial passage or pressurized chamber 36 for receiving compressed air when the seal is inflated with the other opening being an upper channel 37 having a narrow throat 38 therethrough. A support bar 39 of rectangular cross-section is positioned within the opening or channel 37 and is supported by an adjustment in the form of an assembly 41 within a U-shaped channel 42 formed on the panels 11, 14, 22 and 23 for receiving the sealing structure 30. Preferably a plurality of adjustment assemblies 41 are positioned along the length of the support bars 39. The length of each support bar 39 and the spacing between the adjustment assemblies 41 depends upon the particular load requirements of the hatch cover system. Each adjustment assembly 41 comprises a pair of elements one being in the form of a hollow bushing 43 having external threads threading into an internally threaded aperture 44 in the top wall of the U-shaped channel 42. The other element of each of the adjustment assemblies 41 may be in the form of a bolt 46 which extends through the bushing 43 and is threaded into an aperture 47 in the support bar 39. The bushing 43 is provided with an upper wall 48 engaged by the bolt head and a lower end portion 50 engaged by the support bar 39 when the bolt 46 is tightened.

To adjust the sealing structure 30 in the channel 42, it is merely necessary to loosen the bolts 46 and rotate the respective bushings 43 to thread the bushings 43 up or down and move the support bars 39 relative to the channel 42. After the proper adjustment is reached, the bolts 46 may be tightened, thus locking the hatch cover system in the adjusted position. In this way the sealing structure 30 may be adjusted relative to the channel 42 to compensate for any irregularities in the mating surface caused by manufacturing tolerances or the like and to insure that the sealing structure 30 is properly positioned to provide the proper sealing engagement between the sealing structure 30 and the mating surface of the coaming 10 of the hatchway.

The junction between the bottom portion 31 of the sealing structure 30 and the corner element 33 is provided by cementing on open-ended tubular insert 51 into the pressure passage 36 of the bottom portion 31 and corner portion 33. Preferably, the tubular insert 51 has a lower durometer than the material forming the two sealing portions 31, 33 so that it will be urged into tight sealing engagement by the pressure of the air within the pressure passage 36. This provides a convenient and simple method of connecting the two elements so that a continuously fluid tight pressure passage is provided throughout the extent of the sealing structure 30. Another tubular insert 51 is provided at the joint between the two corner elements 33 and 34 and between the corner element 34 in the lateral portion 32 of the sealing structure 30. Also, a vertical support bar 52 is used in the vertical section formed by the two corner elements 33 and 34. Here again, an adjustable assembly 41 is used to accurately position the support bar 52.

Throughout most of the length of sealing structure 30, the support bars 39 and 52 are not bonded to the walls of the channel 37 so that the seal may move relative to and along the support bars 39 and 52 to properly position itself and relieve localized stresses. However, at one location E on each of the panels 11, 14, 22 and 23 the support bar 39 may be bonded or cemented to the lower wall of the channel 37 in the zone around conduit means in the form of an air inlet tube 53. The tube 53 is in turn connected to a source of fluid pressures and a control system and operates to permit air under pressure to be supplied to the pressure passage 36 when the sealing structure 30 is to be inflated and provides the exhaust passage to relieve the pressure when the sealing structure 30 is deflated.

When the seal is inflated by air under pressure within the pressure passage 36, it expands into sealing engagement with the coaming 10 and operates to raise the panels until a stop member 62 on a dogging assembly 58 firmly engages a chaffing bar 61 carried by the coaming 10 of the hatchway. In the usual construction an inflating pressure in the order of 40 to 50 pounds per square inch will operate to raise the panels 11, 14, 22 and 23 of the hatch cover system so that the stop member 59 firmly engages the chaffing bar 61. The inflating pressure also acts to laterally expand the sealing structure 30 into tight sealing engagement with the confining channel 42.

In the operation of the hatch cover system, it is necessary, during the opening cycle, to first deflate the sealing structure 30, and thereafter release the dog member 58. The sequence is reversed during the closing cycle of the hatch cover assembly in that folding actuators first completely extend the panels 11, 14, 22 and 23 and the dogging members 58 are then moved to the locked or dogged position and thereafter, the sealing structure 30 is inflated.

Since the sealing structure 30 operates to lift the panels 11, 14, 22 and 23 causing engagement between the dogging members 58 and the chaffing bar 61, the panels 11, 14, 22 and 23 are securely locked in their closed position as illustrated in FIGURE 1 of the drawing. The sealing structure 30 should be arranged so that a slight amount of interference is provided between the deflated seal and the coaming 10 when the panels 11, 14, 22 and 23 are in their extended or closed position to provide a fluid tight joint in the event that air pressure is lost. This amount of interference, however, does not result in damage to the sealing structure 30 when the hatch cover system is operated.

Those skilled in the art will recognize that a hatch cover system incorporating this invention provides the high degree of reliability necessary for such shipboard applications and simplified controls which insure the proper operation of the system. The use of power to operate all of the components of the hatch cover system increases the speed of operation, thus providing substantial savings in both time and manpower.

The detailed features of the dogging assemblies 58 together with the actuating and operating means therefor as well as the relative arrangement thereof, the automatic sequential control arrangement and actuators for the hatch cover system, the various possible sources of hydraulic fluid, control valving and fluid conduits, etc., are more fully described, disclosed, illustrated and shown in my copending application Serial Number 123,785, identified above of which this application is a continuation-in-part and, for the sake of brevity, there has been no detailed discussion of these features in the instant application. Should a better understanding be needed with regard to these features, reference may be made to my previously identified copending application.

While the invention has been described, disclosed, illus-

What is claimed is:

1. An inflatable seal for providing a fluid tight joint between two members comprising a U-shaped channel on one member,
   a resilient seal positioned in said channel formed with a pressure passage along one side thereof adjacent the open side of said channel,
   a recess having a lateral width open to the side of said seal opposite said one side through a throat having a lateral width less than the width of said recess,
   a support in said recess,
   means extending through said throat adjustably positioning said support relative to the bottom of said channel, and
   means admitting fluid under pressure to said pressure passage causing said seal to expand against the side walls of said channel and the other of said members to form a fluid tight joint therebetween.

2. An inflatable seal for providing a fluid tight joint between two members comprising a U-shaped channel on one member,
   a resilient seal positioned in said channel formed with a pressure passage along one side thereof adjacent the open side of said channel,
   a recess having a lateral width open to the side of said seal opposite said one side through a throat having a lateral width less than the width of said recess,
   an elongated rigid support in said recess,
   a plurality of bushings threaded into the bottom of said channel at spaced points therealong and extending through said throat,
   said bushings each having an end face,
   a bolt extending through each bushing and threaded into said rigid support clamping it against said end face and locking the associated bushing against rotation,
   support means extending through said throat adjustably supporting said bar on the bottom of said channel, and
   means admitting fluid under pressure to said pressure passage causing said seal to expand against the side walls of said channel and the other of said members to form a fluid tight joint therebetween.

3. Sealing structure for providing a fluid type joint between two members one of which is provided with a channel,
   said inflatable sealing structure comprising
   a resilient seal positioned in the channel of the one member,
   said seal having a pressure passage extending along that side of the seal which is disposed adjacent the open side of the channel and a recess disposed adjacent to the closed side of the channel of the one member,
   a support in the recess of the seal,
   an adjustment for positioning the support relative to the channel of the one member, and
   means for admitting fluid under pressure to the pressure passage of the seal to enable the seal to expand against the channel and the other one of said members to create the fluid type joint therebetween.

4. Inflatable sealing structure for providing a fluid type joint between two members one of which is provided with a U-shaped channel,
   said inflatable sealing structure comprising
   a resilient seal disposed in the channel of the one member,
   said seal having a pressure passage and a recess,
   adjustable support structure, said support structure comprising
   an element disposed within the recess of the seal,
   a bushing threadably supported by the channel,
   a bolt-like element extending through the bushing and threadably supported by the element, and
   means for admitting fluid under pressure to the pressure passage of the seal for enabling the seal to expand against the channel and the other one of the members to form a fluid type joint therebetween.

5. Sealing structure for effecting a seal between two members, one of which is provided with a channel opening in a direction generally toward the other member,
   said structure comprising,
   a resilient seal disposed within the channel of the one member,
   said seal having a plurality of openings extending therethrough,
   one of said openings defining a pressure chamber,
   a support disposed within the other opening of the seal, and
   an adjustment for varying the position of the support relative to the channel of the one member.

6. The sealing structure as defined in claim 5 wherein said adjustment comprises
   an assembly having a pair of threadably engageable elements,
   one of said elements being carried by the channel of the one member with the other element being carried by the support.

7. The sealing structure as set forth in claim 5 together with
   a source of fluid pressure, and
   conduit means for placing the pressure chamber of the seal in communication with the source of fluid pressure.

8. The sealing structure as set forth in claim 7 together with
   means for securing said support to the seal at a location which is adjacent the conduit means.

9. The sealing structure as set forth in claim 5 wherein said seal is defined by a plurality of sections, and open-ended inserts are disposed intermediate adjacent ones of said sections.

10. In combination with a member having an open sided channel formed therein,
    sealing structure for effecting a seal between the member and a second member,
    said sealing structure comprising
    a resilient seal disposed within the channel of said member,
    said seal having a pressure chamber and an opening,
    said pressure chamber being disposed intermediate the opening in the seal and the open side of the channel of the member,
    a support disposed within the opening in the seal, and
    an adjustment for varying the position of the support relative to the channel of the member,
    said adjustment comprising,
    an assembly having a pair of threadably engageable elements,
    one of said elements being carried by the channel of the member with the other element being carried by the support.

11. The structure as set forth in claim 10 wherein each of said members is a panel of a hatch cover system.

12. The structure as set forth in claim 10 wherein said member is a panel of a hatch cover system, and said second member is a part of a hatchway.

13. In combination with a hatch cover system having a plurality of panels pivotaly interconnected for movement between retracted and extended positions whereat the system is effective to open and close, respectively, a hatchway,
sealing structure for creating a seal between adjacent ones of the panels as well as between the panels and the hatchway,
said sealing structure comprising
a resilient open ended tubular seal disposed in channels provided along the side edge positions and the adjacent end portions of the panels of the hatch cover system,
each of said seals having a pressure chamber and an opening,
a support disposed within the openings of the seals,
an adjustment for varying the position of each of the supports relative to the respective channel,
each of said adjustments comprising an element carried by the associated channel and another element carried by the respective support with the elements of the adjustments being in threaded engagement with each other,
an open ended tubular insert secured between adjacent ones of the side and end seals of each of the panels for placing the pressure chambers and openings in communication,
conduit means for placing the pressure chambers of each of the seals in communication with a source of fluid pressure to expand the seals against the respective channels, associated supports and the adjacent panel or hatchway, as the case may be, and
means for securing each of the seals to the associated supports at a location therealong which is adjacent the conduit means.

References Cited by the Examiner
UNITED STATES PATENTS

| | | | |
|---|---|---|---|
| 2,753,827 | 7/1956 | Sabin | 114—201 |
| 2,945,467 | 7/1960 | Wigeland | 114—202 |
| 3,180,302 | 4/1965 | Hamilton | 114—203 |

FERGUS S. MIDDLETON, *Primary Examiner.*

ANDREW H. FARRELL, *Examiner.*